(12) United States Patent
Albrecht et al.

(10) Patent No.: US 11,285,569 B2
(45) Date of Patent: Mar. 29, 2022

(54) SOLDERING MATERIAL BASED ON SN AG AND CU

(71) Applicants: Henkel AG & Co. KGaA, Duesseldorf (DE); Heraeus Deutschland GmbH & Co. KG, Hanau (DE); Alpha Assembly Solutions Inc., Somerset, NJ (US)

(72) Inventors: Hans-Jurgen Albrecht, Berlin (DE); Gunnar Petzold, Dresden (DE); Klaus Wilke, Berlin (DE); Klaus Heinrich Georg Bartl, Essen (DE); Hector Andrew Hamilton Steen, Herts (GB); Klaus Muller, Bayreuth (DE); Werner Kruppa, Essen (DE); Mathias Nowottnick, Berlin (DE); Klaus Wittke, Berlin (DE)

(73) Assignees: Henkel AG & Co. KGaA, Duesselford (DE); Heraeus Duetschland GmbH & Co. KG, Hanau (DE); Alpha Assembly Solutions Inc., Somerset, NJ (US)

( * ) Notice: Subject to any disclaimer, the term of this patent is extended or adjusted under 35 U.S.C. 154(b) by 0 days.

(21) Appl. No.: 16/530,053

(22) Filed: Aug. 2, 2019

(65) Prior Publication Data
US 2020/0023472 A1 Jan. 23, 2020

Related U.S. Application Data

(60) Division of application No. 10/554,274, filed on Sep. 13, 2006, now Pat. No. 10,376,994, which is a
(Continued)

(30) Foreign Application Priority Data

Apr. 25, 2003 (DE) .................................. 10319888

(51) Int. Cl.
B23K 35/00 (2006.01)
B23K 35/26 (2006.01)

(52) U.S. Cl.
CPC ................................ *B23K 35/262* (2013.01)

(58) Field of Classification Search
None
See application file for complete search history.

(56) References Cited

U.S. PATENT DOCUMENTS

| 4,758,407 A | 7/1988 | Ballentine et al. |
| 4,806,309 A | 2/1989 | Tulman |

(Continued)

FOREIGN PATENT DOCUMENTS

| CN | 85108518 | 4/1987 |
| CN | 1050151 | 3/1991 |

(Continued)

*Primary Examiner* — Stefanie J Cohen
(74) *Attorney, Agent, or Firm* — BakerHostetler

(57) ABSTRACT

The invention relates to a soldering material comprising an alloy that in addition to Sn (tin) as the major constituent, comprises 10 wt. % or less Ag (silver), 10 wt. % or less Bi (bismuth), 10 wt. % or less Sb (antimony) and 3 wt. % or less Cu (copper). Furthermore, the invention relates to a soldering material comprising a plurality of soldering components with such alloy compositions and contents in the soldering material that on fusing the soldering components an alloy is formed that comprises Sn, Ag, Bi, Sb and Cu in the abovementioned alloy contents.

10 Claims, 1 Drawing Sheet

Related U.S. Application Data continuation of application No. PCT/DE2004/000852, filed on Apr. 21, 2004.

(56) References Cited

U.S. PATENT DOCUMENTS

| | | | |
|---|---|---|---|
| 4,941,929 A | 7/1990 | Tecle | |
| 5,384,090 A | 1/1995 | Ogashiwa | |
| 5,393,489 A | 2/1995 | Gonya et al. | |
| 5,405,577 A | 4/1995 | Seelig et al. | |
| 5,538,686 A | 7/1996 | Chen et al. | |
| 5,837,191 A | 11/1998 | Gickler | |
| 5,863,493 A | 1/1999 | Achari et al. | |
| 5,980,822 A | 11/1999 | Moon et al. | |
| 5,985,212 A | 11/1999 | Hwang et al. | |
| 6,146,883 A | 11/2000 | Grass | |
| 6,156,132 A | 12/2000 | Yamashita et al. | |
| 6,179,935 B1 | 1/2001 | Yamashita et al. | |
| 6,197,253 B1 | 3/2001 | Broomfield et al. | |
| 6,224,690 B1 | 5/2001 | Andricacos et al. | |
| 6,229,248 B1 | 5/2001 | Kusabiraki et al. | |
| 6,264,093 B1 | 7/2001 | Piiukaitis et al. | |
| 6,319,461 B1 * | 11/2001 | Domi | B23K 35/262 148/400 |
| 6,325,279 B1 | 12/2001 | Sakai et al. | |
| 6,361,742 B2 | 3/2002 | Takeda et al. | |
| 6,365,097 B1 | 4/2002 | Yamashita et al. | |
| 6,371,361 B1 | 4/2002 | Yamaguchi et al. | |
| 6,428,745 B2 | 8/2002 | Yamaguchi et al. | |
| 6,428,911 B2 | 8/2002 | Kitajima et al. | |
| 6,474,537 B1 | 11/2002 | Hasegawa et al. | |
| 6,488,888 B2 | 12/2002 | Murata et al. | |
| 6,517,602 B2 | 2/2003 | Sato et al. | |
| 6,677,179 B2 | 1/2004 | Yin et al. | |
| 6,726,780 B2 | 4/2004 | Ono et al. | |
| 6,805,974 B2 | 10/2004 | Choi et al. | |
| 6,815,086 B2 | 11/2004 | Dockus et al. | |
| 6,915,944 B1 | 7/2005 | Takaya et al. | |
| 7,097,090 B2 | 8/2006 | Satou et al. | |
| 7,208,842 B2 | 4/2007 | Jeong | |
| 7,572,343 B2 | 8/2009 | Lee et al. | |
| 7,663,242 B2 | 2/2010 | Lewis et al. | |
| 7,776,651 B2 | 8/2010 | Hua | |
| 10,376,994 B2 | 8/2019 | Albrecht et al. | |
| 2002/0051728 A1 | 5/2002 | Sato et al. | |
| 2002/0155024 A1 | 10/2002 | Hwang | |
| 2003/0178476 A1 * | 9/2003 | Kanai | B23K 35/0244 228/248.1 |
| 2006/0040112 A1 | 2/2006 | Dean et al. | |

FOREIGN PATENT DOCUMENTS

| | | |
|---|---|---|
| CN | 1015306 | 1/1992 |
| CN | 1016358 | 4/1992 |
| CN | 1039923 | 9/1998 |
| CN | 1252842 | 5/2000 |
| CN | 1332057 | 1/2002 |
| CN | 1346728 | 5/2002 |
| CN | 1104991 | 4/2003 |
| CN | 1176779 | 11/2004 |
| CN | 1185077 | 1/2005 |
| CN | 1197683 | 4/2005 |
| CN | 1201896 | 5/2005 |
| CN | 1209803 | 7/2005 |
| CN | 1647868 | 8/2005 |
| CN | 1681648 | 10/2005 |
| CN | 1238153 | 1/2006 |
| CN | 1242869 | 2/2006 |
| CN | 1767921 | 5/2006 |
| CN | 1285442 | 11/2006 |
| CN | 1894791 | 1/2007 |
| CN | 1298490 | 2/2007 |
| CN | 100340685 | 10/2007 |
| CN | 101076446 | 11/2007 |
| DE | 3830694 | 9/1990 |
| DE | 19816671 A1 | 10/1998 |
| DE | 69706507 | 10/1998 |
| DE | 10003665 A1 | 8/2000 |
| DE | 19904765 | 9/2004 |
| EP | 0351462 A1 | 1/1990 |
| EP | 0629466 | 12/1994 |
| EP | 0847829 | 6/1998 |
| EP | 1245328 A1 | 10/2002 |
| EP | 1284301 | 2/2003 |
| EP | 0646048 | 1/2006 |
| EP | 1665337 | 6/2006 |
| GB | 747813 A | 4/1956 |
| JP | S49-038858 | 4/1974 |
| JP | H05-228685 | 9/1993 |
| JP | H07-502369 | 3/1995 |
| JP | H07-088680 | 4/1995 |
| JP | H08-132277 | 5/1996 |
| JP | H08132279 | 5/1996 |
| JP | 2001-347393 | 6/1996 |
| JP | H08-164496 | 6/1996 |
| JP | H09-029480 | 2/1997 |
| JP | H09-052191 | 2/1997 |
| JP | H09-085484 | 3/1997 |
| JP | H09-094688 | 4/1997 |
| JP | H09-192877 | 7/1997 |
| JP | H09-216089 | 8/1997 |
| JP | H09206981 | 8/1997 |
| JP | H09-234586 | 9/1997 |
| JP | H09-277082 | 10/1997 |
| JP | H09-326554 | 12/1997 |
| JP | H09-327790 | 12/1997 |
| JP | H10-006077 | 1/1998 |
| JP | H10013015 | 1/1998 |
| JP | H10-043882 | 2/1998 |
| JP | H10-076389 | 3/1998 |
| JP | H10-109187 | 4/1998 |
| JP | H10-233577 | 9/1998 |
| JP | H10-291087 | 11/1998 |
| JP | H11-033774 | 2/1999 |
| JP | H11-058066 | 3/1999 |
| JP | H11-077367 | 3/1999 |
| JP | H11-114691 | 4/1999 |
| JP | H11-226776 | 8/1999 |
| JP | H11-226777 | 8/1999 |
| JP | H11-291083 | 10/1999 |
| JP | H11-320177 | 11/1999 |
| JP | H11-333590 | 12/1999 |
| JP | 2000-015476 | 1/2000 |
| JP | 2000-061685 | 2/2000 |
| JP | 2000-094181 | 4/2000 |
| JP | 2000-158179 | 6/2000 |
| JP | 2001-358456 | 6/2000 |
| JP | 2000-280090 | 10/2000 |
| JP | 2002-153990 | 11/2000 |
| JP | 2000-349433 | 12/2000 |
| JP | 2001-170792 | 6/2001 |
| JP | 2001-170798 | 6/2001 |
| JP | 2001217531 | 8/2001 |
| JP | 2001232491 | 8/2001 |
| JP | 2001334384 | 12/2001 |
| JP | 2002-001520 | 1/2002 |
| JP | 2002-001573 | 1/2002 |
| JP | 2002-011593 | 1/2002 |
| JP | 2002022650 | 1/2002 |
| JP | 2002-076599 | 3/2002 |
| JP | 2002086294 | 3/2002 |
| JP | 2002-120085 | 4/2002 |
| JP | 2002-124533 | 4/2002 |
| JP | 2003211283 | 7/2003 |
| JP | 2003-275892 | 9/2003 |
| JP | 2003-286531 | 10/2003 |
| JP | 2003297873 | 10/2003 |
| JP | 2003-311469 | 11/2003 |
| JP | 2005-517535 | 6/2005 |
| JP | 2005-186160 | 7/2005 |
| JP | 2003001482 | 7/2005 |
| JP | 2006524572 | 11/2006 |
| JP | 2007512136 | 5/2007 |
| JP | 2007-533457 | 11/2007 |

(56) References Cited

FOREIGN PATENT DOCUMENTS

| | | |
|---|---|---|
| JP | 2009-297789 | 12/2009 |
| JP | 2001-170797 | 6/2011 |
| JP | 2012081521 | 4/2012 |
| KR | 100194147 | 2/1999 |
| KR | 100207888 | 4/1999 |
| KR | 100220800 | 6/1999 |
| KR | 100246229 | 12/1999 |
| KR | 100659527 | 12/1999 |
| KR | 100292295 | 3/2001 |
| KR | 100333401 | 4/2002 |
| KR | 100337497 | 5/2002 |
| KR | 100438409 | 6/2004 |
| KR | 100444786 | 8/2004 |
| KR | 100749183 | 8/2007 |
| TW | 431931 | 5/2001 |
| TW | 472513 | 1/2002 |
| WO | 0048784 | 8/2000 |
| WO | 01/03878 | 1/2001 |
| WO | 0197580 | 12/2001 |

\* cited by examiner

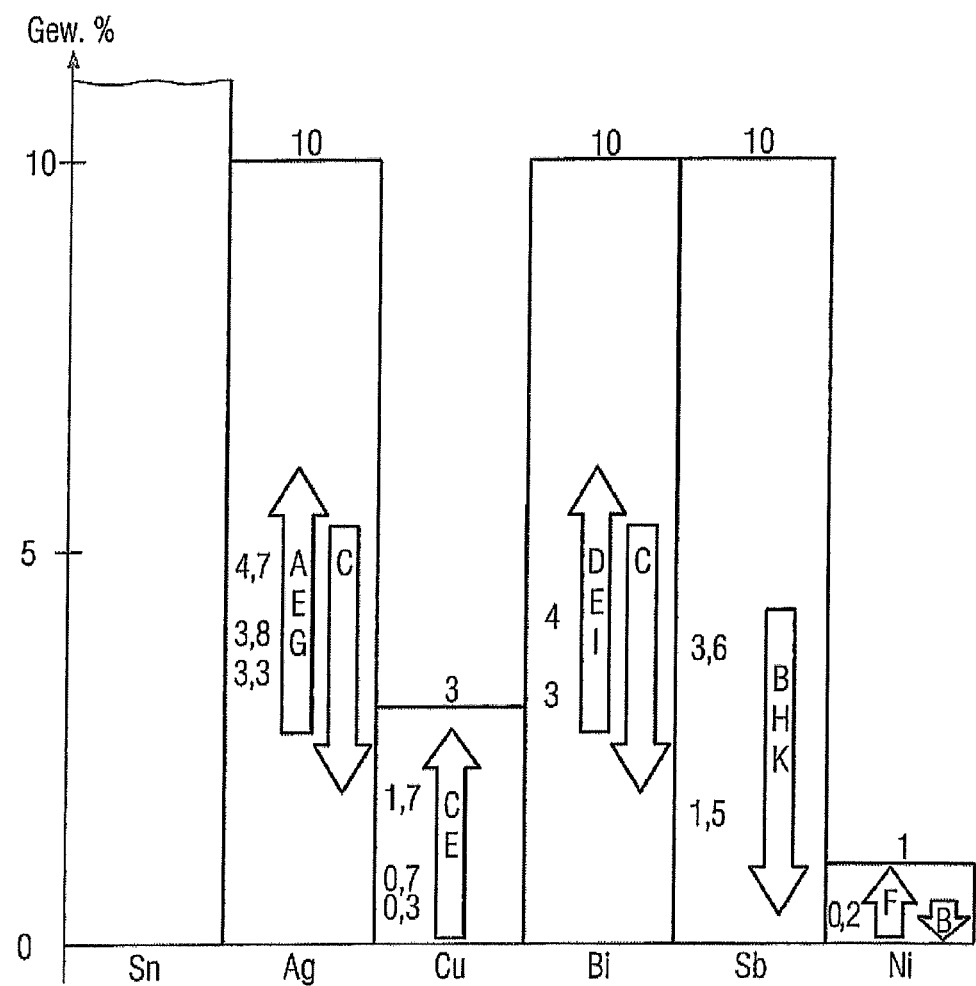

SOLDERING MATERIAL BASED ON SN AG AND CU

This application is a divisional application of U.S. patent application Ser. No. 10/554,274, now U.S. Pat. No. 10,376, 994, filed Sep. 13, 2006, which is a 371 application and claims the benefit of International Patent Application No. PCT/DE2004/000852, filed on Apr. 21, 2004, which claims priority to DE Application 10319888, filed Apr. 25, 2003, which is hereby incorporated by reference in its entirety.

BACKGROUND OF THE INVENTION

Field of the Invention

The invention relates to a soldering material comprising an alloy that in addition to Sn (tin) as the major constituent, comprises 10 wt. % or less Ag (silver), 10 wt. % or less Bi (bismuth), 10 wt. % or less Sb (antimony) and 3 wt. % or less Cu (copper). Furthermore, the invention relates to a soldering material comprising a plurality of soldering components with such alloy compositions and contents in the soldering material that on fusing the soldering components an alloy is formed that comprises Sn, Ag, Bi, Sb and Cu in the abovementioned alloy contents.

BRIEF DESCRIPTION OF RELATED TECHNOLOGY

Soldering materials of the abovementioned composition are particularly used when commonly used lead-containing soldering materials need to be replaced because of their unfavorable environmental compatibility. Thus, for example in International Patent Publication No. WO 01/03878, a soldering material is described, that in addition to Sn as the major constituent, comprises up to 10% Ag, up to 5% Cu, up to 10% Sb and up to 10% Bi. In addition, a soldering material is known from European Patent Application No. EP 0 629 466 A1 and which comprises at least 90 wt. % Sn and further constituents Ag, Bi, Sb and Cu. Moreover, a soldering material is known from International Patent Publication No. WO 00/48784, formed from a plurality of soldering components as a reaction solder, which on melting of the solder components forms an alloy, in which in addition to Sn as the major component are comprised 1-10% Bi, up to 5% Sb, up to 3% Cu and up to 6% Ag.

The cited soldering materials are based on the SnAgCu-ternary system, which particularly for the composition SnAg3.8Cu0.7 forms a eutectic with a melting point of 217° C. It is also known that this melting point can be reduced, for example by alloying with Bi to an alloy content of up to 10 wt. %. Bismuth can also find use as a component in a reaction solder, for example the eutectic SnAgCu alloy mentioned above, is mixed as one component with Sn43Bi47 as the other component with a melting point of 138° C., such that the reaction solder begins to melt at a markedly lower temperature.

SUMMARY OF THE INVENTION

The object of the invention consists in specifying a soldering material based on the SnAgCu-system, which exhibits a comparatively low melting point and at the same time is designed for the highest possible usage temperatures of the soldered joints being formed.

According to the invention, this object is achieved when the alloy of the soldering material additionally comprises 1.0 wt. % or less Ni (nickel). For the case where, for example, the soldering material is formed with a plurality of solder components as a reaction solder, the object is achieved according to the invention when at least one of the solder components further comprises Ni in such an amount that the alloy resulting from the fusion of the solder components comprises 1.0 wt. % or less Ni.

BRIEF DESCRIPTION OF A FIGURE

FIG. 1 depicts a bar chart showing on the x axis specified elements and on the y axis wt. %.

DETAILED DESCRIPTION OF THE INVENTION

For the six-material system obtained in this way, it has been shown that the melting point of the soldering material drops below the eutectic melting point of the ternary system SnAgCu of 217° C., such that at a peak temperature in a reflow solder oven of 230° C., a sufficient difference in melting point of the soldering material is ensured to enable a reliable formation of the solder joint being produced. This accounts for the fact that manufacturers can no longer guarantee the maximum values of heat transfer into the soldered components of 260° C. for a period of 10 seconds, as specified in IEC, for modern components of complex assemblies. The permissible peak temperatures for these so-called advance packages are at 230° C. for a period of 10 seconds.

The melting point of the soldering material obtained by alloying up to 1 wt. % or less nickel to the five-material system SnAgCuBiSb is not substantially altered. However, it was surprisingly found that the alloying of Ni is associated with a marked improvement in creep resistance of the soldering material. Advantageously, in this manner increased operating temperatures of the soldered joint are possible. Today's often required operating temperatures of up to 150° C. can therefore be guaranteed without problem by the use of the inventive soldering material. By selective adjustments of the alloy contents of the inventive six-material system, a soldering material can even be prepared which meets the already partially required operating temperatures of up to 180° C.

The improvement in the creep resistance of soldered joints from the inventive soldering materials can be explained by the fact that Ni forms intermetallic phases with Bi (NiBi with ca. 75 wt. % Bi or $NiBi_3$ with ca. 91 wt. % Bi) which preferentially separate out at the grain boundaries, thereby leading to a dispersion hardening of the soldered structure. At the same time, elemental Bi is displaced into the interior of the grains, causing a solid solution hardening, which also contributes towards an improvement in the creep resistance. In addition, this prevents the alloy component Bi from forming, particularly with Sn, local alloy compositions having low-melting eutectics, which would lead to a local melting of the solder joint at low temperatures and thereby to a dramatic fall in creep resistance (eutectic of the alloy system SnBi, for example at 138° C.).

The positive effect of Ni on the creep resistance, mentioned above, by the action of Ni on the alloy component Bi, is however only observed if the content of Bi in the alloy composition does not exceed 10 wt. %. In this respect there is a marked difference to a soldering material according to German Patent Document No. DE 199 04 765 A1, in which Sn, Ag, Cu, Bi, Sb and Ni containing alloys are indeed disclosed, however the Bi content of the alloy ranges from 43 to 58 wt. %. Due to the already mentioned eutectic of the SnBi system of 138° C., this leads to the soldering materials disclosed in German Patent Document No. DE 199 04 765 A1 having melting points not higher than 140° C. A qualification of these soldering materials for soldered joints with an operating temperature of up to 150° C. is therefore not given, as these soldering materials would be already liquid at 150° C. Due to its more than 20% higher Bi content when compared with the inventive soldering material, the hardening mechanisms described for the inventive soldering material are, incidentally, not applicable to the soldering material of German Patent Document No. DE 199 04 765 A1.

According to the invention, the alloy comprises 2 to 5 wt. % Ag, 1 to 3 wt. % Bi, 1 to 3 wt. % Sb, 0.5 to 1.5 wt. % Cu and 0.05 to 0.3 wt. % Ni. Alloying the alloy elements to Sn in the specified ranges has proved to be particularly advantageous because the SnAgCu-system is present as the basis of the alloy in the near-eutectic range and due in particular to the further alloying components Bi, Sb and Ni, a balanced combination of a decrease in melting temperature with respect to the SnAgCu eutectic and an improvement in creep resistance can be attained. In this connection, the particular importance of the Ni content in the alloy is to be mentioned; Ni is only soluble up to about 0.2 wt. % in the structure of the soldered joint, and thus the nickel content above 0.2 wt. % provokes the precipitation of other alloying elements, primarily at the grain boundaries, thus affording a dispersion hardening.

A special reaction solder or also strip solder is obtained with a soldering material comprising a soldering component M1 and a further soldering component M2 (see FIG. 1), in which the soldering component M1, in addition to Sn as the major constituent, comprises 2 to 5 wt. % Ag, 3 to 12 wt. % Bi, 0.5 to 1.5 wt. % Cu and 0.1 to 0.3 wt. % Ni and the further soldering component M2, in addition to Sn as the major constituent, comprises 2 to 5 wt. % Ag, 0.5 to 1.5 wt. % Cu, 1 to 5 wt. % Sb and 1.0 wt. % Ni. According to another aspect of the invention, a further reaction solder/strip solder consists of a soldering material wherein a soldering component M1 and a further soldering component M2 are provided in which the soldering component M1, in addition to Sn as the major constituent, comprises 2 to 5 wt. % Ag, 3 to 6 wt. % Bi, 1 to 3 wt. % Sb and 0.5 to 1.5 wt. % Cu and the further soldering component M2, in addition to Sn as the major constituent, comprises 2 to 5 wt. % Ag, 0.5 to 1.5 wt. % Cu and 1.0 wt. % Ni.

In both variants of the reaction solder/strip solder, the Bi content of the soldered joint being formed is concentrated in the solder component M1, while the solder component M2 is Bi-free. In this manner the melting point of the solder component M1 is lowered with respect to that of the solder component M2, and solder components of various melting points are combined with each other in the soldering material. The low-melting solder component advantageously wets the surfaces to be soldered (e.g. on component and substrate) already at low temperatures. During the soldering process there results an alloy formation between the solder components M1 and M2, wherein the resulting homogeneous alloy has a higher melting point than the lower melting solder component M1. The resulting alloy compositions of the homogeneous alloy advantageously possess, as described above, a higher creep resistance. In this way the abovementioned, required use temperatures for the soldered joint are ensured. Comparisons of the processing of formulated solder powders based on a single solder component and reaction solder powders based on a mixture of two solder components have moreover demonstrated that the process temperatures for the soldering process can be reduced by about 5 to 10° C. This can be explained as follows: after exceeding the melting temperature of the low-melting solder component M1, the higher melting solder component M2 is solubilized by the molten solder component M1, and the contact surfaces of the soldered joint are wetted even substantially below the melting temperature of the alloy under formation, i.e. the alloy that results from the homogeneous mixture of the solder components M1 and M2.

In a further aspect of the invention, the solder component M1 and the further solder component M2 are combined in the ratio M1:M2=1:1.5 to 9, i.e. at least in the ratio 1:1.5 and at the most in the ratio 1:9, based on the weight of M1 and M2. Advantageously, different alloy contents can be produced in the required alloy by varying the mix ratio M1:M2, wherein only the two solder components M1 and M2 serve as the source for these different alloy contents. In this way, soldering materials can be advantageously produced particularly economically as the storage costs for only a few solder components remain correspondingly low.

In yet a further aspect of the invention, an alloy is provided with a ratio Sb:Bi from 1:1.5 to 3, i.e. a ratio of at least 1:1.5 and at most 1:3, particularly however a ratio of 1:2, based on the weight of Sb and Bi. This Sb:Bi ratio range has been shown to form a particularly fine structure with a low grain size in the soldered joint. In this context it was observed that a solution of up to 0.2 wt. % Ni in the structure produced a reduction in grain size. This effect is strongest for a mix ratio Sb:Bi of 1:2, and thus the grain size can be controlled by varying this Sb:Bi ratio within the abovementioned range.

In yet another aspect of the invention, an alloy is provided having a Ni-content of 0.05 to 0.2 wt. %. For these contents of Ni below the solubility limit of ca. 0.2 wt. % Ni, only limited nickel-containing precipitations occur in the structure of the soldered joint. On exceeding the Ni-content of 0.2 wt. %, the Ni-containing precipitations increase, particularly at the grain boundaries, thus allowing the previously cited process of dispersion hardening to be controlled. Of course, for Ni-contents of less than 0.2 wt. %, there also exists a correlation between an increasing Ni-content and an increase in finely dispersed distributed precipitates; indeed, the formation of precipitates below the solubility limit of Ni is determined by the adjustment of equilibria between soluble and precipitated Ni.

A particularly advantageous soldering material for use as a solder has the composition SnAg3.3-4.7Cu0.3-1.7Bi2Sb1Ni0.2. The advantages of using the alloying elements Bi, Sb and Ni have already been described. The cited compositions of the base alloy SnAgCu are near-eutectic compositions with respect to the SnAgCu eutectic. Hypoeutectic compositions of the base system are preferred, as these compositions are observed to form finer particles (precipitates) in reflow soldering.

A particularly advantageous soldering material that is used as reaction solder or strip solder comprises a soldering component M1 with the alloy composition SnAg3.8Cu0.7Bi10Ni0.15 and a further soldering component M2 with the alloy composition SnAg3.8Cu0.7Sb2.0Ni0.15. When forming the target alloy from the solder components, a eutectic composition is advantageously reached for the SnAgCu base system.

Advantageously, the contents of the soldering component M1 and the further soldering component M2 in the soldering material form the ratio M1:M2=30 wt. %:70 wt. %. The Bi-content is then 3 wt. % and the Sb-content 1.4 wt. %, whereby the condition Sb:Bi=1:2 is approximately attained.

The effects of a variation of the alloy contents of the individual alloy proportions for the inventive six-element alloy are qualitatively represented in FIG. 1. In each case shown, Sn forms the major component, i.e. the Sn-content depends on the alloy content of the further alloy components so as to complete the alloy to 100 wt. %; naturally not taking into account further trace amounts of contaminants that are not intended in the context of this application to be understood as alloying elements. Independently of this, contaminants may also have a positive impact on the use of the soldering material. Thus, a phosphorus content in the per thousand range (based on weight), for example, is expected to improve the oxidative properties of the soldered joint.

The ranges in wt. % next to the arrows in FIG. 1 represent standard values for the individual alloy contents, which have demonstrated from a number of factors that the property profile of the resulting soldered joint is particularly advantageous. However, in the context of the invention, this should not be understood as a limitation on the claimed ranges for the individual alloy, components. Rather, the requirements of the specific case can lead to solder alloy compositions that lie outside the advantageous ranges shown in FIG. 1 and which must be individually determined by experimentation.

The arrows are indicated by letters that denote each investigated property presented in the Table below. The arrows each point in the direction in which the corresponding property increases on varying the alloy content. (See FIG. 1.)

| Arrow | Alloying component | Affected property |
|-------|-------------------|-------------------|
| A | Ag | Resistance to dealloying |
| B | Sb, Ni | Dealloying rate |
| C | Ag, Cu, Bi | Thermal stability/creep resistance |
| D | Bi | Compression strength |
| E | Ag, Cu, Bi | Shear resistance |
| F | Ni | Promoter for formation of precipitates |
| G | Ag | Size of precipitates |
| H | Sb | Homogenization of the structure |
| I | Bi | Lowers initial melting in the melting range |
| K | Sb | Lowers the upper limit of the melting range |

The soldering material can be used in all common shapes like bars, rods, wires, films, powder or coatings. The contacts to be soldered, for example can be coated, it being possible to coat one contact with the solder component M1 and the other contact with the solder component M2. Layered solders can also be manufactured by coating, in which the solder components M1 and M2 alternate. Fundamentally, soldering materials having more than two components are also imaginable, the layered solder consisting of layers coated on top of each other in the appropriate order.

The solder components M1 and M2 and possibly further solder components can also be mixed with one another in powder form so as to create a reaction solder. The powdered soldering material can, of course, also be treated with a binder to form a solder paste.

The invention claimed is:

1. A soldering material comprising a soldering component M1 and a soldering component M2,
   wherein the soldering component M1, in addition to Sn as a major component, comprises 2-5 wt % Ag, 3-12 wt % Bi, and 0.5-1.5 wt % Cu, and
   wherein the soldering component M2, in addition to Sn as a major component, comprises 2-5 wt % Ag, 0.5-1.5 wt % Cu, and 1 wt % Ni, and does not include Bi,
   wherein on fusing the soldering components, M1 and M2, an alloy is formed that, in addition to Sn (tin) as the major constituent, comprises 10 wt. % or less Ag (silver), 10 wt. % or less Bi (bismuth), 10 wt. % or less Sb (antimony) and 3 wt. % or less Cu (copper).

2. The soldering material according to claim 1 wherein the alloy comprises 2 to 5 wt. % Ag, 1 to 3 wt. % Bi, 1 to 3 wt. % Sb, 0.5 to 1.5 wt. % Cu and 0.05 to 0.3 wt. % Ni.

3. The soldering material according to claim 1 wherein the soldering component M1 and the soldering component M2 are provided in which the soldering component M1, in addition to Sn as the major constituent, comprises 2 to 5 wt. % Ag, 3 to 12 wt. % Bi, 0.5 to 1.5 wt. % Cu and 0.1 to 0.3 wt. % Ni and the soldering component M2, in addition to Sn as the major constituent, comprises 2 to 5 wt. % Ag, 0.5 to 1.5 wt % Cu, 1 to 5 wt. % Sb and 1.0 wt. % Ni.

4. The soldering material according to claim 1 wherein the soldering component M1 and the soldering component M2 are provided in which the soldering component M1, in addition to Sn as the major constituent, comprises 2 to 5 wt. % Ag, 3 to 6 wt. % Bi, 1 to 3 wt. % Sb and 0.5 to 1.5 wt. % Cu and the soldering component M2, in addition to Sn as the major constituent, comprises 2 to 5 wt. % Ag, 0.5 to 1.5 wt. % Cu and 1.0 wt. % Ni.

5. The soldering material according to claim 3 wherein the soldering component M1 and the soldering component M2 are combined in the ratio M1:M2=1:1.5 to 9, based on the weight of M1 and M2.

6. The soldering material according to claim 1 wherein in the alloy there exists a ratio Sb:Bi of 1:1.5 to 3, based on the weight of Sb and Bi.

7. The soldering material according to claim 6 wherein the alloy exhibits a Ni-content of 0.05 to 0.2 wt. % based on the total weight of the alloy.

8. The soldering material according to claim 1 wherein the alloy is SnAg3.3-4.7Cu0.3-1.7Bi2Sb1Ni0.2.

9. A soldering material comprising a soldering component M1 which is SnAg3.8Cu0.7Bi10Ni0.15 and soldering component M2 which is SnAg3.8Cu0.7Sb2.0Ni0.15.

10. The soldering material according to claim 9 wherein the contents of the soldering component M1 and the soldering component M2 in the soldering material form the ratio M1:M2=30 wt. % 70 wt. %.

* * * * *